United States Patent
Liu et al.

(10) Patent No.: US 11,695,878 B2
(45) Date of Patent: Jul. 4, 2023

(54) ADJUSTABLE AND DYNAMIC THRESHOLDS IN WIRELESS NETWORKS

(71) Applicant: T-Mobile USA, Inc., Bellevue, WA (US)

(72) Inventors: James Chungyu Liu, Bellevue, WA (US); Anthony E. Johnson, Lees Summit, MO (US)

(73) Assignee: T-MOBILE USA, INC., Bellevue, WA (US)

( * ) Notice: Subject to any disclaimer, the term of this patent is extended or adjusted under 35 U.S.C. 154(b) by 55 days.

(21) Appl. No.: 17/219,565

(22) Filed: Mar. 31, 2021

(65) Prior Publication Data
US 2022/0321704 A1 Oct. 6, 2022

(51) Int. Cl.
*H04W 4/24* (2018.01)
*H04M 15/00* (2006.01)
*H04W 8/18* (2009.01)
*H04W 24/08* (2009.01)

(52) U.S. Cl.
CPC ......... *H04M 15/887* (2013.01); *H04M 15/41* (2013.01); *H04M 15/58* (2013.01); *H04M 15/66* (2013.01); *H04M 15/8214* (2013.01); *H04W 4/24* (2013.01); *H04W 8/18* (2013.01); *H04W 24/08* (2013.01); *H04M 2215/782* (2013.01); *H04M 2215/788* (2013.01)

(58) Field of Classification Search
CPC .................................. H04W 4/24; H04W 8/18
See application file for complete search history.

(56) References Cited

U.S. PATENT DOCUMENTS

| | | | | |
|---|---|---|---|---|
| 8,538,379 | B1* | 9/2013 | Stachiw | H04M 15/58 379/114.03 |
| 2010/0216424 | A1* | 8/2010 | Gans | H04L 43/0876 455/405 |
| 2011/0275344 | A1* | 11/2011 | Momtahan | H04L 12/1417 455/466 |
| 2011/0276442 | A1 | 11/2011 | Momtahan et al. | |
| 2012/0094631 | A1 | 4/2012 | Pattabiraman | |
| 2012/0101952 | A1 | 4/2012 | Raleigh et al. | |
| 2013/0198374 | A1* | 8/2013 | Zalmanovitch | H04M 15/846 709/224 |
| 2014/0004815 | A1 | 1/2014 | Shaw | |
| 2014/0068212 | A1* | 3/2014 | Lin | H04L 47/00 711/162 |
| 2014/0179266 | A1 | 6/2014 | Schultz et al. | |

(Continued)

OTHER PUBLICATIONS

International Search Report and Written Opinion dated Jun. 13, 2022, International Application No. PCT/US2022/018096, International Filing Date Feb. 28, 2022.

*Primary Examiner* — Barry W Taylor
(74) *Attorney, Agent, or Firm* — Summit Patents PC

(57) ABSTRACT

Techniques and architectures enable a wireless communications network to allow for dynamic changes or on-the-fly selections of Fair Usage thresholds or other thresholds and to allow for the Fair Usage thresholds to be associated with individual subscribers of the wireless communications network. Subscriber groups of relatively small granularity or individual subscribers may be assigned a profile that sets forth actions to be applied to subscribers in response to the subscribers reaching particular thresholds of data usage.

18 Claims, 9 Drawing Sheets

(56) References Cited

U.S. PATENT DOCUMENTS

| | | | |
|---|---|---|---|
| 2015/0049606 A1* | 2/2015 | So | H04L 47/808 370/230 |
| 2021/0274426 A1* | 9/2021 | Grayson | H04W 4/24 |
| 2022/0086066 A1* | 3/2022 | Pothireddy | G06N 20/00 |

* cited by examiner

Table 100

| Rate Plan | FUT Name/Identifier | FUT Value |
|---|---|---|
| RP1 | FUT1 | 35GB |
| RP2 | FUT2 | 50GB |
| RP3 | FUT3 | 75GB |
| RP4 | NOF | -- |

Data Usage ↓

Action-Triggering Profiles

Table 212

| Threshold Scale | ATP for RP1 | ATP for RP2 | ATP for RP3 | ATP for Rate Plan of FIG. 2A |
|---|---|---|---|---|
| 80% of 35GB | Send notice to subscriber | No action | No action | Send notice to subscriber |
| 35GB | Reduce traffic priority for subscriber | No action | No action | Change cost for subscriber |
| 80% of 50GB | Send notice to subscriber | Send notice to subscriber | No action | Send notice to subscriber |
| 50GB | Perform action | Reduce traffic priority for subscriber | No action | Reduce traffic priority for subscriber |
| 80% of 75GB | No action | Send notice to subscriber | Send notice to subscriber | Send notice to subscriber |
| 75GB | No action | Perform action | Reduce traffic priority for subscriber | Perform action |

FIG. 2B

Table 214

| Threshold Scale | ATP for Subscriber 1 of RP1 (marketing promotion beneficiary) | ATP for Subscriber 2 of RP1 (late with bill payment) |
|---|---|---|
| 80% of 35GB | During March, no action | Send notice to subscriber |
| 35GB | During March, no action | Send notice to subscriber regarding unpaid bill and reduce traffic priority |
| 80% of 50GB | During March, no action | Send notice to subscriber |
| 50GB | During March, no action | Reduce traffic priority for subscriber and charge penalty |
| 80% of 75GB | No action | Send notice to subscriber |
| 75GB | No action | Charge penalty |

FIG. 2C

ADJUSTABLE AND DYNAMIC THRESHOLDS IN WIRELESS NETWORKS

BACKGROUND

Wireless communications providers face ever-increasing use of portable computing devices on their networks. Such devices include laptop computers, smart phones, wearable computers, Internet of Things (IoT) devices, and the like. As these devices become increasingly commonplace, the quantity of data conveyed by wireless networks similarly increases. Telecommunications technology continues to evolve to meet current demands. Wireless communications providers continue to invest in state-of-the-art technology so as to remain at the forefront of offerings in the marketplace. Nevertheless, these providers are constantly challenged to ensure trouble-free support for wireless data communications protocols. Among such challenges is presence of a portion of wireless network subscribers who consume excessive bandwidth at the expense of other subscribers.

Generally, subscribers are provided with a relatively high bandwidth limit. A high bandwidth limit ensures that the current generation of data communication devices and their uses is fully supported. Wireless communications providers assume that individual subscribers in their customer base infrequently reach this high bandwidth limit. However, some subscribers exploit this high bandwidth setting and continuously use the wireless service at the high bandwidth limit. These subscribers are considered to be abusing the communications network. Since there is an overall bandwidth limit in any given geographical coverage area, continuous usage at an excessive level by certain subscribers reduces the available bandwidth for the rest of a subscriber base. The net result is a diminished experience for the vast majority of subscribers.

Generally, wireless communications providers impose policies to limit subscribers' usage of their services. For example, data use exceeding a threshold may require a subscriber to pay additional fees or face reduced bandwidth for the subscriber, based on whether they have exceeded the threshold. For example, subscribers may opt-in to sign up/purchase a rate plan that provides a limited high-speed data bucket. If the subscriber exceeds that data bucket, the speed may be throttled/reduced, or they may need to pay for overage.

Generally, wireless communications providers may impose Fair Usage thresholds or Fair Use Policies on their unlimited data plans and provide subscribers with real-time usage threshold alerts. Fair Use Policy is an agreement between the United States Federal Communications Commission (FCC) and individual wireless communications providers (e.g., carriers), such as T-Mobile, Comcast, and Verizon. Fair Use Policy includes all data usage, include all roaming locations, any type of free video or music streaming contents, and regular home data usage, just to name some examples. If subscribers have selected to use their data at pre-defined high-speed level, once exceeding the threshold on Fair Usage policy, the subscribers may be subject to downgraded data traffic transmission priority.

Particular values for Fair Usage thresholds are generally a priori established and fixed for all subscribers of a particular rate plan. Changing these values may be relatively difficult and may involve extensive engineering and coding of the network of the wireless communications provider. What is therefore needed are systems and methods that allow for dynamically changing Fair Usage thresholds while involving relatively little or no engineering or coding.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

FIGS. 2B and 2C are tables of instructions for what actions are to be performed based on two action-triggering profiles respectively tailored to two subscribers, according to various embodiments.

DETAILED DESCRIPTION

Described herein are techniques and architectures for enabling a wireless communications network to allow for dynamic changes or on-the-fly selections of Fair Usage thresholds or other thresholds and to allow for the Fair Usage thresholds to be associated with individual subscribers of the wireless communications network. This is in contrast to particular Fair Usage thresholds being associated or assigned to rate plans for relatively large groups of subscribers. In embodiments described herein, subscriber groups of relatively small granularity or individual subscribers may be assigned a profile that sets forth actions to be applied to subscribers in response to the subscribers reaching particular thresholds of data usage. For example, thresholds may exist for high speed data, tethering, and video streaming, just to name a few examples, and each such threshold may be a basis for differing notifications. Additionally, subscribers may be assigned dynamic Fair Usage thresholds. The term "dynamic Fair Usage threshold" refers to a Fair Usage threshold that may be changed or selected for one or more subscribers in a spontaneous fashion, without a need for modifying or substantially impacting programming code used for managing Fair Usage thresholds for a wireless communications network. For example, the network may have predefined values of multiple Fair Usage or other thresholds and can update these values without code modifications.

A Fair Usage threshold is a restriction imposed on a subscriber by a wireless communications network on the transfer of data by the subscriber over the network. For example, a Fair Usage threshold may be used in a policy imposed by the wireless communications network, or an internet service provider, so as to conditionally limit a subscriber's usage of their services. Generally, exceeding a Fair Usage threshold may result in any of a number of actions by the wireless communications network, hereinafter "network". In some cases, the network may reduce the quality of the service for the subscriber, hereinafter "lower the data transmission priority" or "data priority" available to the subscriber.

Figures 1, 2A:
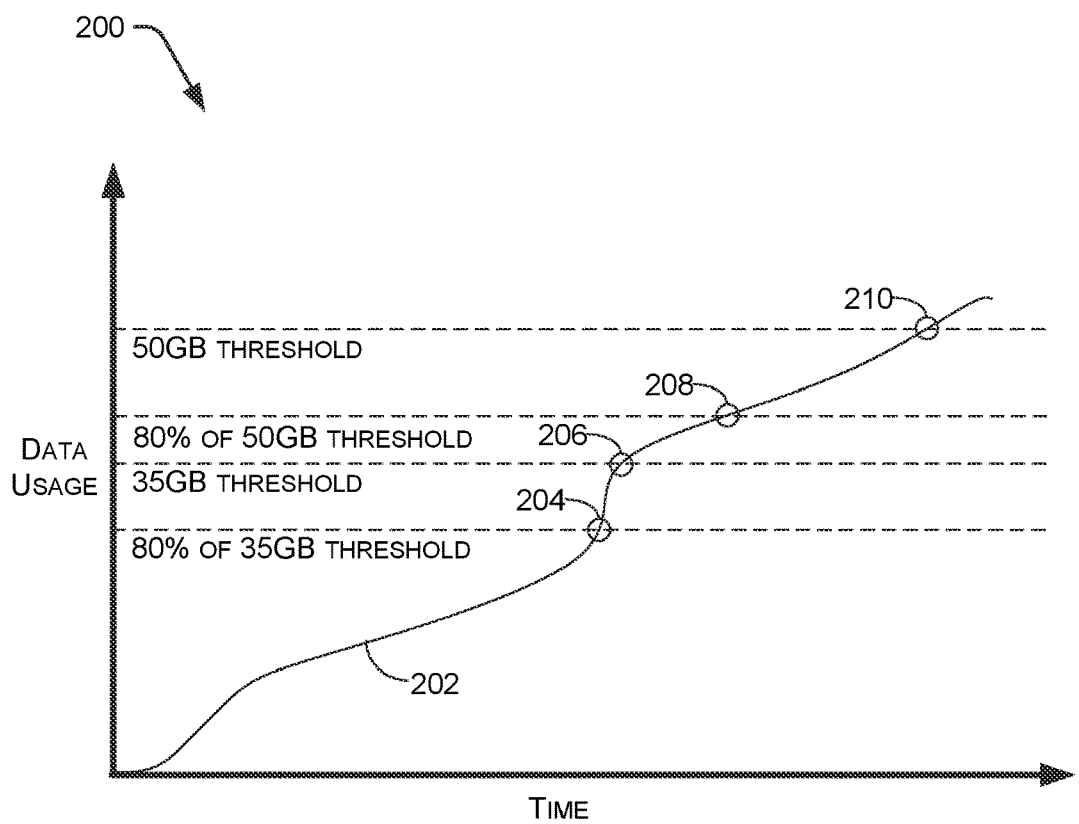
FIG. 1 is a table of rate plans and corresponding FUT values of a wireless communications network, according to various embodiments.
FIG. 2A is a graph of data usage versus time for an example subscriber of a wireless communications network, according to various embodiments.

Networks generally base subscriber policies on (data) usage-based pricing that is associated with Fair Usage thresholds. Thus, subscriber usage may be metered in discrete steps in price levels of various rate plans (e.g., usage plans). FIG. 1 is a table 100 of example rate plans and corresponding Fair Usage thresholds, according to a particular embodiment. For example, a network may provide various rate plans to which customers may subscribe. Generally, lower cost rate plans correspond to a lower value of Fair Usage threshold (hereinafter, FUT). From the table, rate plan RP1 corresponds to FUT1 having a value of 35 gigabytes (GB). Similarly, rate plan RP2 corresponds to FUT2 having a value of 50 GB, and rate plan RP3 corresponds to FUT3 having a value of 75 GB. Another rate plan, RP4, with an identifier "NOF", may correspond to some premium data plans with no associated FUT.

Though Fair Usage thresholds are cited herein, embodiments and claimable subject matter are not so limited. For example, any type of threshold or number limit may be considered in the example embodiments herein.

FIG. 2A is a graph 200 of data usage versus time for a subscriber of a particular rate plan of a network, according to various embodiments. Though numerical examples are given, claimable subject matter is not limited to such examples: Thresholds associated with a rate plan may correspond to any of a number of conditions and actions.

Graph 200 provides an example of how a rate plan and corresponding thresholds (each corresponding to a particular action, in various examples) may be applied by a network. The rate plan of the example of FIG. 2A has a 35 GB threshold that corresponds to a usage limit of high-speed data at a discounted cost. Beyond the 35 GB threshold the rate may be increased for the subscriber of this particular rate plan. The illustrated rate plan has an FUT of 50 GB. Curve 202 represents data usage (e.g., data consumption, data uploading and downloading, or data receiving and transmitting) by the subscriber. In order of elapsed time, at event 204 the subscriber's data usage reaches 80% of the 35 GB threshold for high-speed data at a discounted cost. Event 204 may trigger an action by the network, which may be to send a notice (e.g., a warning email or text) to the subscriber stating that the subscriber is approaching the limit of 35 GB for discounted cost for high-speed data. At event 206, the subscriber's data usage reaches the 35 GB threshold. Event 206 may trigger an action by the network, which may be to increase the cost of high-speed data for the subscriber and to send a notice of such an action (e.g., via email or text) to the subscriber. At event 208, the subscriber's data usage reaches 80% of the FUT (50 GB). Event 208 may trigger an action by the network, which may be to send a notice (e.g., a warning email or text) to the subscriber stating that the subscriber is approaching the FUT. At event 210, the subscriber's data usage reaches the FUT (50 GB). Event 210 may trigger an action by the network, which may be to reduce the data traffic priority or limit access for the subscriber and to send a notice of such an action (e.g., via email or text) to the subscriber.

Herein, a sequence of thresholds is referred to as a threshold scale. Such thresholds may include FUTs (e.g., an FUT for respective data plans) and fractions thereof, or any other type of threshold or data usage level. For example, a threshold scale for FIG. 2A corresponds to the illustrated sequence of thresholds that lead to the respective events 204-210 (e.g., actions). Thus, this threshold scale comprises four values, which are 80% of 35 GB, 35 GB, 80% of 50 GB, and 50 GB. This threshold scale is used for a two-tiered (e.g., high-speed data limit at 35 GB and FUT at 50 GB) rate plan of the example of FIG. 2A. As another example, the threshold scale for RP1 (a single-tier rate plan) of Table 100 may comprise two values, which are 80% of 35 GB and 35 GB. Similarly, the threshold scale for RP2 may comprise two values, which are 80% of 50 GB and 50 GB. The threshold scale for RP3 may comprise two values, which are 80% of 75 GB and 75 GB. In various embodiments, a system may dynamically (e.g., in real-time or on-the-fly) adjust FUTs by modifying a threshold scale.

As described in detail below, in some embodiments, a single threshold scale may be used for multiple rate plans. For example, such a single threshold scale for rate plans RP1, RP2, and RP3 may be an aggregation of the threshold scales for each of these rate plans, which may comprise six values, which are 80% of 35 GB, 35 GB, 80% of 50 GB, 50 GB, 80% of 75 GB, and 75 GB. In various embodiments, as described in detail below, a network may use action-triggering profiles for subscribers to determine how to apply the single threshold scale to different rate plans and to different subscribers. The network of such embodiments may, among other things, allow for a customization of rate plans so as to be unique to individual subscribers. An action-triggering profile (ATP) may comprise instructions on what actions (or inactions) to perform at particular thresholds. For example, An ATP may comprise instructions, such as computer-readable code, that direct the network to perform actions that correspond to rules associated with particular rate plans of the network or rules specific to individual subscribers. For a distinct example, rules of a rate plan for a subscriber (or rules for the particular subscriber) may set forth two thresholds, one at 35 GB and a subsequent one at 50 GB (e.g., for an FUT). The rules may dictate that the network is to notify the subscriber of a near-threshold state when the subscriber reaches 80% (or any other percentage) of an FUT, and to reduce data priority for the subscriber when the FUT is reached.

As mentioned above, a wireless communications network (e.g., a wireless service provider) may use an ATP for a subscriber to determine when to perform a particular action. For example, the subscriber of the example of FIG. 2A may be associated with an ATP that the system uses to determine what action to perform in response to the subscriber's data usage reaching the various events of graph 200.

An ATP may be unique to the subscriber, having been created or generated based on various parameters of the subscriber, such as the subscriber's current status, history, selected rate plan (e.g., usage plan), and type of wireless device (e.g., device abilities and functionality), just to name a few examples. An ATP may also be catered to the subscriber based on the network's marketing promotions, management decisions, and other criteria, as described below.

The network may select, based at least in part on the ATP of the subscriber, which particular threshold, among multiple thresholds of a threshold scale, to use for triggering an action. For example, a threshold may be an FUT or may be a fraction thereof, such as the 80% thresholds that trigger notifications to be sent to the subscriber, as described for FIG. 2A. Of course, more, less, or different notifications can be configured at percentages different from those in these examples.

In various embodiments, the network uses a data usage counter (hereinafter, "counter") to measure the quantity of data the subscriber consumes using their network subscription. For example, curve 202 of FIG. 2A is an example plot of data usage measured by such a counter. In some implementations, usage of different types of data may be counted separately from one another. The network may use more than one counter. For example, video streaming data usage may be counted separately from internet browsing data usage. In another example, downloaded data may be counted separately from uploaded data. In yet other examples, usage counters may correspond to "charging overage" or "reducing bandwidth" on different types of data behavior and/or usage. In various embodiments, a Fair Usage counter meters all data usage and sends usage information to different Quality of Service (QoS) levels triggered by the ATP to de-prioritize subscribers' data packets based on network congestion status within each particular radio tower, for example. In some embodiments, an ATP may be a function of the type of data usage. In other words, the ATP may dictate different rules for triggering events depending on what type of data is considered. For example, an ATP tailored to a subscriber that is allowed unlimited video streaming data usage will not dictate that bandwidth for the subscriber be reduced at any threshold of a threshold scale for a count of video streaming data.

As explained above, using ATPs for subscribers may allow a network to use a single threshold scale for multiple rate plans. This is in contrast to each rate plan being required to use its own particular threshold scale. To describe how an action-triggering profile may allow a single threshold scale to be used for multiple rate plans, FIG. 2B is a table 212 of instructions for what actions are to be performed based on several ATPs. The following examples also refer to FIGS. 1 and 2A.

Table 212 involves a single threshold scale that includes the following thresholds: 80% of 35 GB, 35 GB, 80% of 50 GB, 50 GB, 80% of 75 GB, and 75 GB. As mentioned above, an ATP may be unique to a particular subscriber (as in example embodiments illustrated below for FIG. 2C). A subscriber assigned to a rate plan (e.g., a rate plan selected by the subscriber) may be correspondingly assigned an ATP associated with the rate plan. (The ATP may subsequently be customized for a subscriber or the rate plan). In some embodiments, an ATP may be generated for a rate plan. In this case, all subscribers of that rate plan may be subjected to the rules dictated by that ATP. In Table 212, rate plans RP1, RP2, RP3, and the rate plan of FIG. 2A each are associated with a corresponding ATP.

In a first example of FIG. 2B, rate plan RP1 uses an ATP that sets forth sending a notice to a subscriber at 80% of 35 GB, reducing traffic priority for the subscriber at 35 GB, sending a notice to the subscriber at 80% of 50 GB, and performing an action, such as reducing the data traffic priority. This ATP does not set forth any actions at subsequent thresholds on the threshold scale, though other ATPs may do so.

In a second example of FIG. 2B, rate plan RP2 uses an ATP that ignores (e.g., does not set forth an action) the first two thresholds of the threshold scale (e.g., 80% of 35 GB and 35 GB thresholds). Thus, as a subscriber of RP2 increasingly consumes data, no action occurs until data usage reaches 80% of 50 GB. At this point, the ATP for rate plan RP2 sets forth sending a notice to the subscriber. Subsequently, increasing data consumption is subject to further actions, dictated by the ATP for rate plan RP2. These actions are reducing traffic priority for the subscriber at 50 GB, sending a notice to the subscriber at 80% of 75 GB, and performing an action, such as reducing data traffic priority.

In a third example of FIG. 2B, rate plan RP3 uses an ATP that ignores (e.g., does not set forth an action) the first four thresholds of the threshold scale (e.g., 80% of 35 GB, 35 GB, 80% of 50 GB, and 50 GB thresholds). Thus, as a subscriber of RP3 increasingly consumes data, no action occurs until data usage reaches 80% of 75 GB. At this point, the ATP for rate plan RP3 sets forth sending a notice to the subscriber. Subsequently, increasing data consumption is subject to at least one further action, dictated by the ATP for rate plan RP3. This action is reducing traffic priority for the subscriber at 75 GB.

In a fourth example of FIG. 2B, the rate plan described for FIG. 2A uses an ATP that sets forth sending a data usage notice to a subscriber at 80% of 35 GB (e.g., event 204) to warn about reducing data priority for the subscriber at 35 GB (e.g., event 206), sending a data usage notice to the subscriber at 80% of 50 GB (e.g., event 208), to warn about reducing data priority for the subscriber at 50 GB (e.g., event 210), sending a notice to the subscriber at 80% of 75 GB, to warn about reducing data priority at 75 GB.

FIG. 2C is a table 214 of instructions for what actions are to be performed based on several ATPs. As described below, in some embodiments, an ATP may be time-dependent (e.g., machine-readable instructions of the ATP may include a function of time or a function dependent on time) based on calendar events or other events measured by a calendar or time of day. Table 214 is used to describe such a time-dependent ATP and also to describe how an action-triggering profile may be customized for individual subscribers while allowing a single threshold scale to be used for multiple subscribers (in the same or different rate plans).

As in Table 212, Table 214 involves a single threshold scale that includes the thresholds 80% of 35 GB, 35 GB, 80% of 50 GB, 50 GB, 80% of 75 GB, and 75 GB. The ATPs are unique to particular subscribers. Generally, a subscriber assigned to a rate plan (e.g., a rate plan selected by the subscriber) may be correspondingly assigned an associated ATP. The ATP may subsequently be customized for a subscriber. Such customization may be in response to marketing promotions, behavior of the subscriber, and so on.

In a first example of FIG. 2C, subscriber 1 of rate plan RP1 is assigned an ATP that, initially upon signing up to the rate plan, may have been a generic ATP being the same for other subscribers of the rate plan. However, subscriber 1 may benefit from a marketing promotion that allows subscriber 1 to have unlimited data usage during March. Accordingly, the network may modify the ATP assigned to subscriber 1 during March. In another implementation, the network may modify the ATP other than during March, in which case the ATP may include instructions for the network to compare a system clock with a calendar and to determine whether to perform an action based on the comparison. Thus, for subscriber 1, at 80% of 35 GB, the (modified) ATP sets forth no action to be performed during March, but otherwise sets forth sending a notice to the subscriber warning of data usage closely approaching 35 GB. At 35 GB, no action is performed during March, but data traffic priority is reduced at other times. At 80% of 50 GB, the ATP sets forth no action to be performed during March, but otherwise sets forth sending a notice to the subscriber warning of data usage closely approaching 50 GB. At 50 GB, no action is performed during March, but data traffic priority is further reduced at other times.

In a second example of FIG. 2C, subscriber 2 of rate plan RP1 is assigned an ATP that, initially upon signing up to the rate plan, may have been a generic ATP being the same for other subscribers (e.g., the same as initially for subscriber 1) of the rate plan. However, subscriber 2 has not paid the bill for wireless services and the network may require the subscriber to pay additional fees, may impose limitations on access to the network, or may terminate service for the subscriber, just to list a few examples. Accordingly, the network may modify the ATP assigned to subscriber 2 during a time when the bill for subscriber 2 is outstanding and not yet paid. In other implementations, the network may modify the ATP other than during such a condition, in which case the ATP may include instructions for the system to check billing and payment status and to determine whether to perform an action based on the status. Continuing with the second example, at 80% of 35 GB the (modified) ATP dictates that a notice is sent to subscriber 2 regarding the unpaid bill and a notice to the subscriber warning of data usage closely approaching 35 GB. At 35 GB, the ATP dictates that a notice is again sent to subscriber 2 regarding the unpaid bill and data traffic priority is reduced. For subsequent thresholds, such actions may be repeated.

Figure 3:
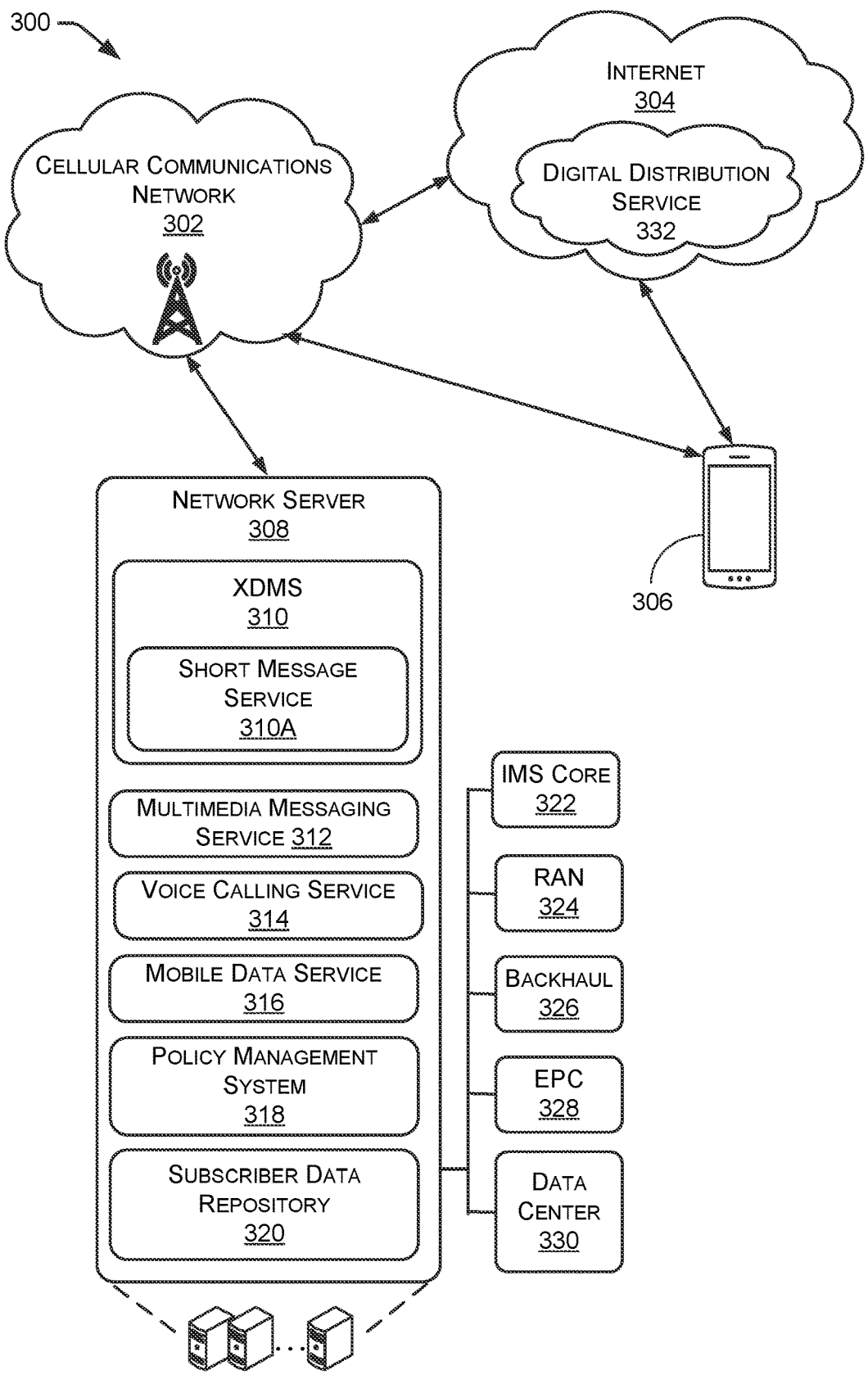
FIG. 3 schematically illustrates a system that includes a cellular communications network and the Internet, according to various embodiments.

FIG. 3 schematically illustrates a system 300 that includes cellular communications network 302 and the Internet 304, according to various embodiments. Network 302 may perform methods and techniques described herein regarding, among other things, ATPs and threshold scales. System 300 provides an environment for a wireless device 306, which may be a mobile device used by a subscriber of cellular communications network 302 (hereinafter, "network 302"). Network 302 may include one or more cellular services providers, such as T-Mobile®, Verizon Wireless®, AT&T®, etc. Wireless device 306 may communicate with one or more other electronic devices and/or systems via network 302.

Network 302 may include a network server 308, which may comprise one or more servers and may provide operational equipment and infrastructure management in support of network 302. Network server 308 may provide back-end delivery and support of cellular network services including, for example, an XDMS 310 that processes a short message service (SMS) 310A, a multimedia messaging service (MMS) 312, a voice calling service 314, a mobile data service 316, a policy management system 318, and a subscriber data repository 320, the latter two entities being described in detail below for FIG. 4.

Network server 308 may include or communicate with various types of operational equipment that support the cellular communications network, such as servers, routers, firewalls, hubs, switches, and so forth. Many of the operational equipment elements communicate over a non-cellular IP (Internet Protocol) network for purposes of control and reporting. Functions of network server 308 may be facilitated by, for example, an IMS (IP Multimedia Subsystem) Core 322, a RAN (Radio Access Network) 324, a Backhaul 326, an EPC (Evolved Packet Core) 328, and a data center 330, which may include memory resources for storing subscriber data and ATPs assigned to the subscribers. System 300 may include multiple instances of any of the illustrated network elements 322-330 and/or other elements that are not shown. System 300 may be distributed over a very large region, such as over an entire country or a portion of a country. System 300 may implement a GSM (global system for mobile communications) network, as one example.

System 300 may include at least portions of the Internet 304, such as those portions (e.g., the Cloud) that include (mobile) applications executed in response to communication with wireless device 306. Internet 304 may include a digital distribution service (DDS) 332 that procures wireless applications, such as an on-line digital store. For example, DDS 330 may sell, share, or distribute any number of applications that may be downloaded to wireless device 306, such as all or portions of applications that may be used by a subscriber to manage their account with network 302. In some embodiments, DDS 333 may include processors that execute applications (e.g., in the Cloud) during engagement with wireless device 306, which may execute an associated application residing in wireless device 306. For example, wireless device 306, hosting account-managing applications, may utilize data storage and computing by servers in the Cloud.

Wireless device 306 may be configured to communicate on network 302 using network services 308-316, depicted with respect to network server 308. Accordingly, wireless device 306 may also include hardware and software supporting communications services such as an SMS, an MMS, a voice calling service, and a mobile data service, among other wireless access technologies. For example, wireless access technologies can include fifth generation (5G) technology, Long Term Evolution (LTE)/LTE Advanced technology, other fourth generation (4G) technology, High-Speed Data Packet Access (HSDPA)/Evolved High-Speed Packet Access (HSPA+) technology, Universal Mobile Telecommunications network (UMTS) technology, Code Division Multiple Access (CDMA) technology, Global System for Mobile Communications (GSM) technology, WiMax® technology, WiFi® technology, and/or any other previous or future generation of wireless access technology.

Although various elements of FIG. 3 are shown and described as being discrete devices or components for purposes of discussion, any of the illustrated computing elements may, in practice, include one or more physical, virtual, or otherwise abstracted cluster or network of machines and/or devices. For example, although network server 308 may be depicted as a single entity, it may comprise any one or more computing devices, including physical devices and virtual computing units, and including network-based devices that are commonly referred to as being in the cloud. Moreover, although a single wireless device (wireless device 306) is depicted, it should be appreciated that system 300 may include any number and types of wireless devices, and of such devices, wireless device 306 is merely a singular non-limiting example.

Figure 4:
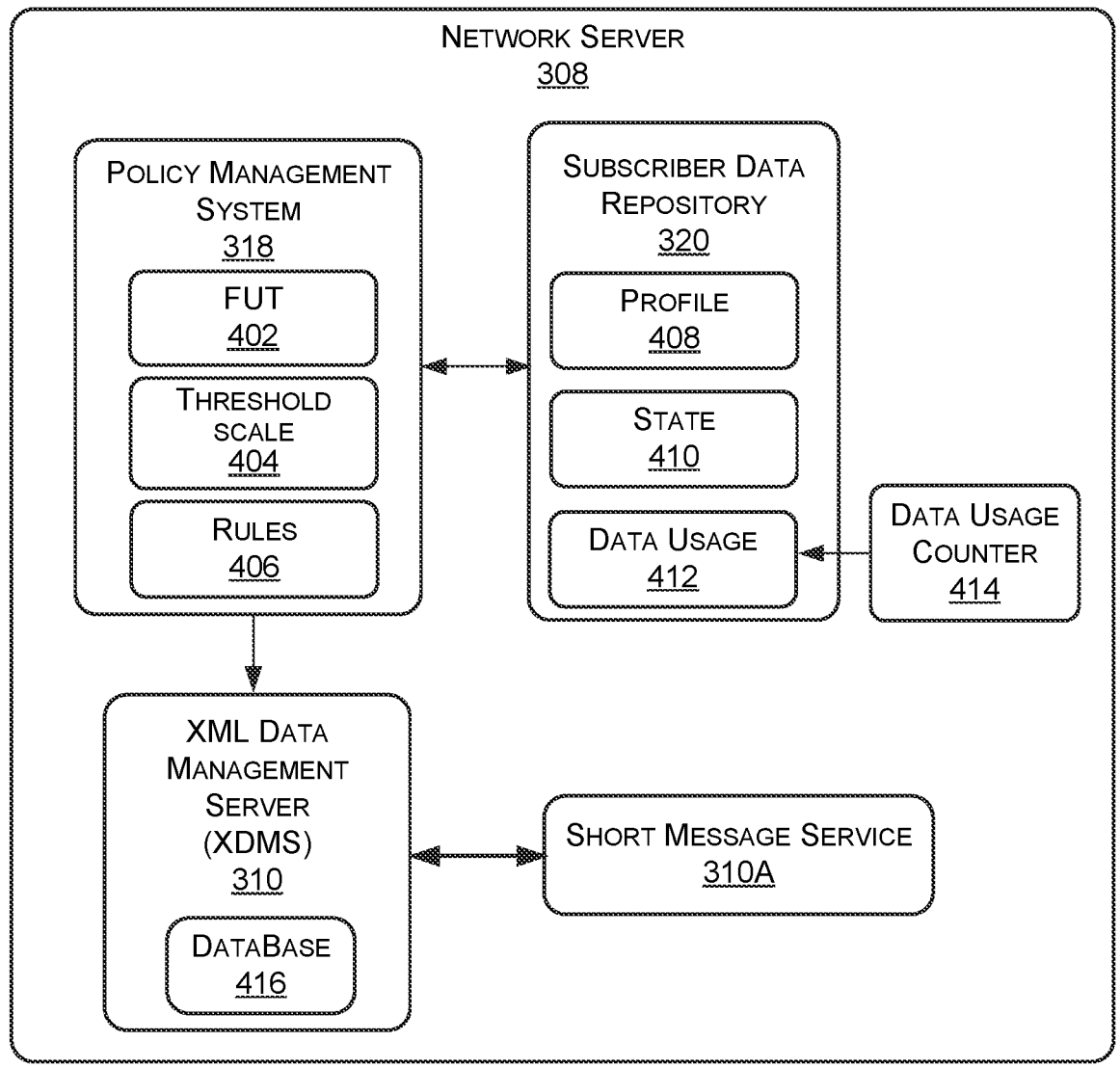
FIG. 4 is a block diagram that illustrates various portions of a network server, according to various embodiments.

FIG. 4 is a block diagram that illustrates various portions of network server 308, according to embodiments. Among other things, network server 308 includes policy management system 318, subscriber data repository 320, and XDMS 310. Network 302 may determine what actions to perform on subscriber accounts using policy management system 318, which includes an FUT block 402, a threshold scale block 404, and a Rules block 406. FUT block 402 maintains values of FUTs for rate plans, such as those in table 100. Threshold scale block 404 maintains a threshold scale, such as that included in Table 212, that includes the FUTs. Rules block 406 maintains rules and protocols, such as those also included in Table 212, that dictate what actions are to be taken with respect to the threshold scale. The FUTs, threshold scale, and the rules may be a priori established by network 302 and may be modified from time to time, periodically, or on-the-fly, as described below.

Network 302 may, at least in part, manage and maintain individual accounts of subscribers using subscriber data repository 320, which includes a profile block 408, a state block 410, and a data usage block 412. Profile block 408 maintains records of individual subscribers. Such records may include the data plan selected by a subscriber, their history of usage, device(s) used, and other information about various aspects of the subscriber. State block 410 may monitor a current state of a subscriber, such as whether the subscriber is offered any marketing promotions, whether or not the subscriber has an outstanding bill, and so on. Data usage block 412 monitors and maintains the amount of data consumed (e.g., transmitted and received) by the subscriber. In some implementations, different types of data may be distinguished from one another. For example, data usage block 412 may separately monitor data consumed for voice communication, streaming video, uploading, downloading, and so on. Data usage block 412 may receive information about data consumption by individual subscribers from data usage counter 414, which counts one or more types of data received and transmitted by the subscriber, as described below.

In some embodiments, XDMS 310 may include a short message peer-to-peer (SMPP) interface to deliver messages (e.g., text messages) drafted by subscribers. XDMS 310 may also include various XDMS enhancements to access an XDMS database 416 for the messages. For example, XDMS 310 may implement executable code to send out a message to a contact (e.g., recipient) via the SMPP interface to a short message service center (SMSC), which includes executable code to determine (e.g., based on a centralized or converged subscriber database (CDB)) if the user is a client of one carrier (e.g., T-Mobile) or another carrier.

Figure 5:
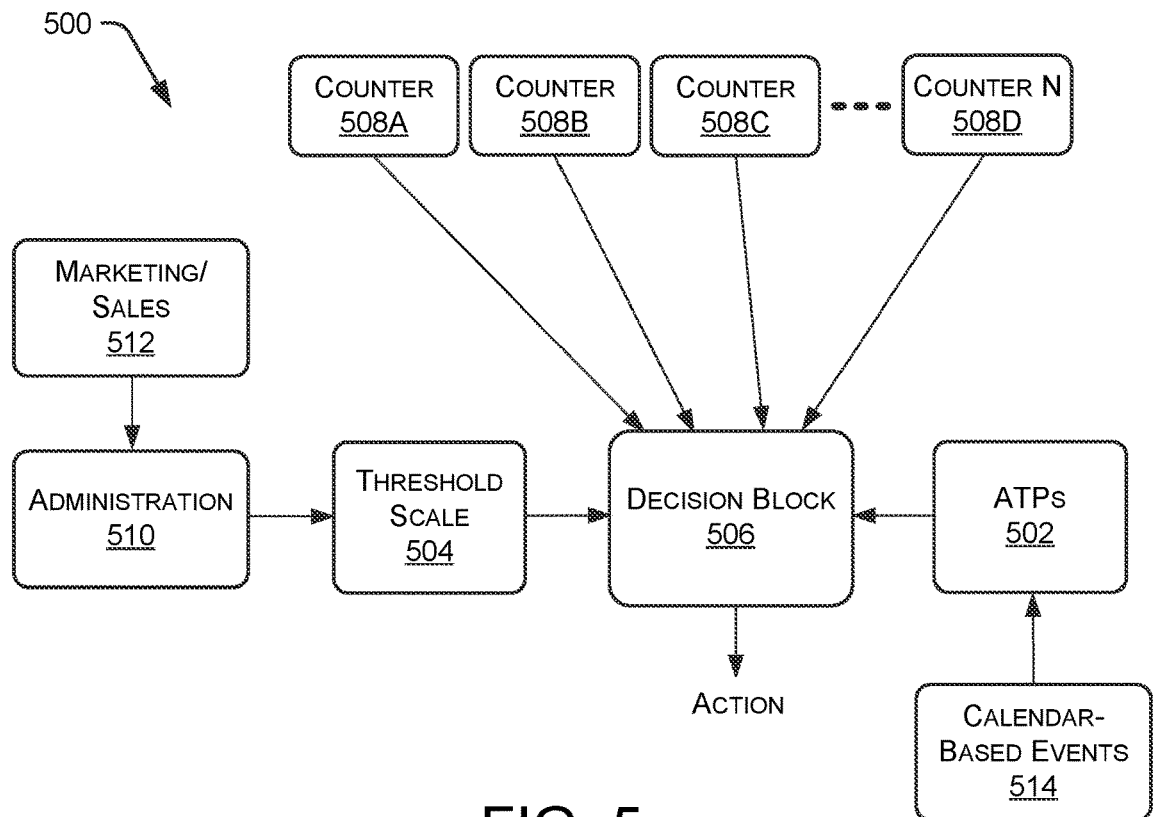
FIG. 5 is a block diagram of a process for applying an action-triggering profile to a threshold scale to determine actions on subscribers' accounts, according to various embodiments.

FIG. 5 is a block diagram of a process 500 for applying ATPs 502 and a threshold scale 504 to subscribers' accounts of network 302, according to various embodiments. Process 500 also includes dynamically establishing or modifying the ATPs or threshold scale, which may in turn be used by a decision block 506. Counts from one or more counters 508 (N counters are illustrated in FIG. 5) and ATPs 502 of subscribers (or their accounts) are provided to decision block 506, which uses these counts and ATPs in view of threshold scale 502 to determine whether to perform particular actions toward the subscribers' accounts. For example, decision block 506 may comprise instructions similar to or the same as those illustrated in Table 212.

As described above, a threshold scale, such as 504, may be a sequence of thresholds that include FUTs and fractions thereof, or any other type of threshold or data usage level. Threshold scale 504 may be established and modified by an administration (e.g., management) 510 of network 302. For example, network 302 may offer rate plans having respective FUTs, which may be changed from time to time. Marketing/sales 512 of network 302 may provide information to administration 510 regarding threshold values, and modifications thereof, for threshold scale 504. For example, marketing/sales 512 may offer a promotion applicable to certain rate plans regarding a temporary increase of an FUT. Accordingly, administration 510 may modify threshold scale 504 to reflect the increase. Decision block 506 may then consider the modified threshold scale when analyzing counts and ATPs. In other implementations, in response to marketing/sales 512 offering a promotion applicable to certain rate plans regarding a temporary increase of an FUT, administration 510 may modify ATPs 502 to reflect the increase. Decision block 506 may then consider the modified ATPs when analyzing counts and the threshold scale.

In some embodiments, ATPs 502 may be changed in response to receiving a policy rule from administration 510 or other entity of the network or wireless service provider. Such a policy rule may comprise one or more rules or guidelines affecting subscribers and operations of the network. Decision block 506 may then modify, based at least in part on the ATPs changed by the policy rule, criteria for selecting among the multiple thresholds of threshold scale 504.

For some embodiments, process 500 illustrates a single threshold scale 504 being used for multiple rate plans. For example, threshold scale 504 for multiple rate plans may be an aggregation of threshold scales for each of the respective rate plans. Network 302 may use ATPs for subscribers to determine how to apply threshold scale 504 to different rate plans. Process 500 may, among other things, allow for a customization of rate plans so as to be unique to individual subscribers. As explained above, an ATP may comprise instructions on what actions (or inactions) to perform at particular thresholds that are included in threshold scale 504. Thus, even in view of a single threshold scale 504, decision block 506 may perform different actions for different subscribers based on their respective ATPs. For example, an ATP of a first subscriber may dictate that data priority for the first subscriber is reduced when their data usage reaches an FUT of 35 GB, while an ATP of a second subscriber may dictate that bandwidth for the second subscriber is reduced when their data usage reaches an FUT of 50 GB (and reaching 35 GB is to be ignored). Though threshold scale 504 may have both values (35 GB and 50 GB) for an FUT, decision block 506 using the ATP for the first subscriber will perform the action of reducing data priority for the first subscriber when their data usage reaches 35 GB but, based on the ATP of the second subscriber, will not perform an action at this threshold for the second subscriber.

In some embodiments, ATPs 502 of subscribers may be modified by calendar-based events 514, as described above. For example, an ATP of a subscriber of a rate plan having an FUT of 35 GB may be modified so that during the month of March the FUT for the subscriber is 50 GB. For instance, this change may be a marketing promotion applied to particular subscribers (e.g., not necessarily all subscribers of that rate plan).

In some embodiments, counters 508 may count particular types of data consumption (e.g., quantity of data received and transmitted) of a subscriber. Such types of data may be, for example, video streaming data, audio communication data (e.g., cellular calls), Internet browsing data, and text data, just to name a few examples. Individual counters (e.g., counter 508A, counter 508B, etc.) may respectively count different types of data consumption. Decision block 506 may apply (e.g., compare) individual counts from the respective counters to threshold scale 504, based on ATPs 502. For example, an ATP for a subscriber may dictate that the subscriber is allowed unlimited video streaming for the month of March, which may be a feature applied to the ATP by calendar-based events 514. In this case, decision block 506 compares the subscriber's data consumption to threshold scale 504 but, based on the ATP, excludes video streaming data consumption as measured by the counter that measures this quantity.

In some embodiments, data consumption amounts measured by individual counters 506 may be combined into a single quantity. In other embodiments, a single counter may be used by decision block 504.

Figure 6:
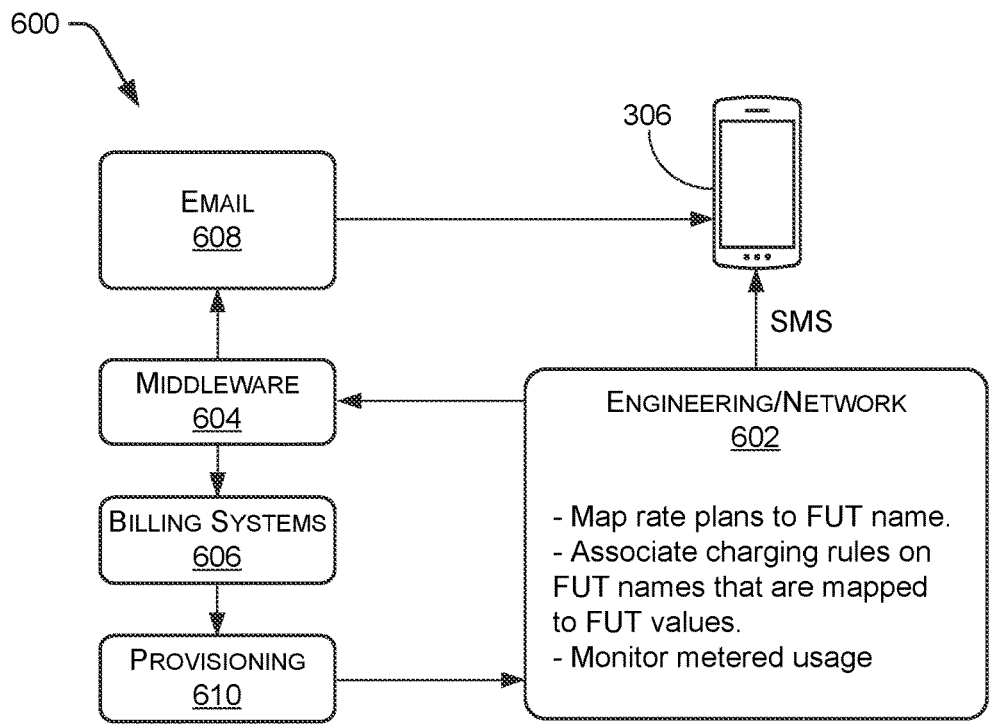
FIG. 6 schematically illustrates a process for sending data usage notifications to a subscriber, according to some embodiments.

FIG. 6 schematically illustrates a portion 600 of network 302, according to some embodiments. Engineering/Network 602 comprises some of the engineering aspects of network 302. For example, policy management system 318 and subscriber data repository 320 may be included in engineering/network 602. Among others, functions performed by engineering/network 602 include mapping or associating rate plans to FUT names. An example of this is illustrated by table 100. Another function is to associating charging rules (e.g., billing) to FUT names that are mapped to FUT values, and to monitor data consumption (e.g., metered usage) by subscribers. Engineering/network 602 may also generate and transmit to a subscriber's wireless device 306 an SMS communication for, among other things, notification regarding whether the subscriber's data consumption is near or exceeded an FUT.

Middleware 604 may provide specialized services and capabilities to network 302, such as for billing systems 606 and email 608. For example, data management, application services, and messaging (e.g., email 608 and SMS) may be implemented by middleware. Email 608 may generate and transmit emails to device 306 for, among other things, notify the subscriber regarding whether the subscriber's data consumption is near or exceeded an FUT. In some embodiments, engineering/network 602 may have visibility to the subscriber's device 306, but not the subscriber's email. Email 608, however, may have the ability to send emails to the subscriber (in some implementations, the subscriber may opt-in to receive email notifications).

Billing systems 606 may make a configuration change in network 302 through provisioning 610. For example, billing systems 606 may change the rate plan assigned to a subscriber and such a change may trigger updates to provisioning, such as SIM updates, port-in requests, device management, and so on. Depending on the change, updates in the network may be triggered. In some embodiments, Engineering/Network 602 may include machine-readable code to differentiate among FUTs with a flag/parameter sent by billing systems 606. Upon receiving this flag/parameter, a converged charging system (CCS) may provide new threshold values based on an existing Fair Usage metering counter. If the flag/parameter is not present, the original unified fair usage threshold (e.g., 50 GB for FUT2 and 35 GB for FUT1, per Table 100) may instead apply.

Figure 7:
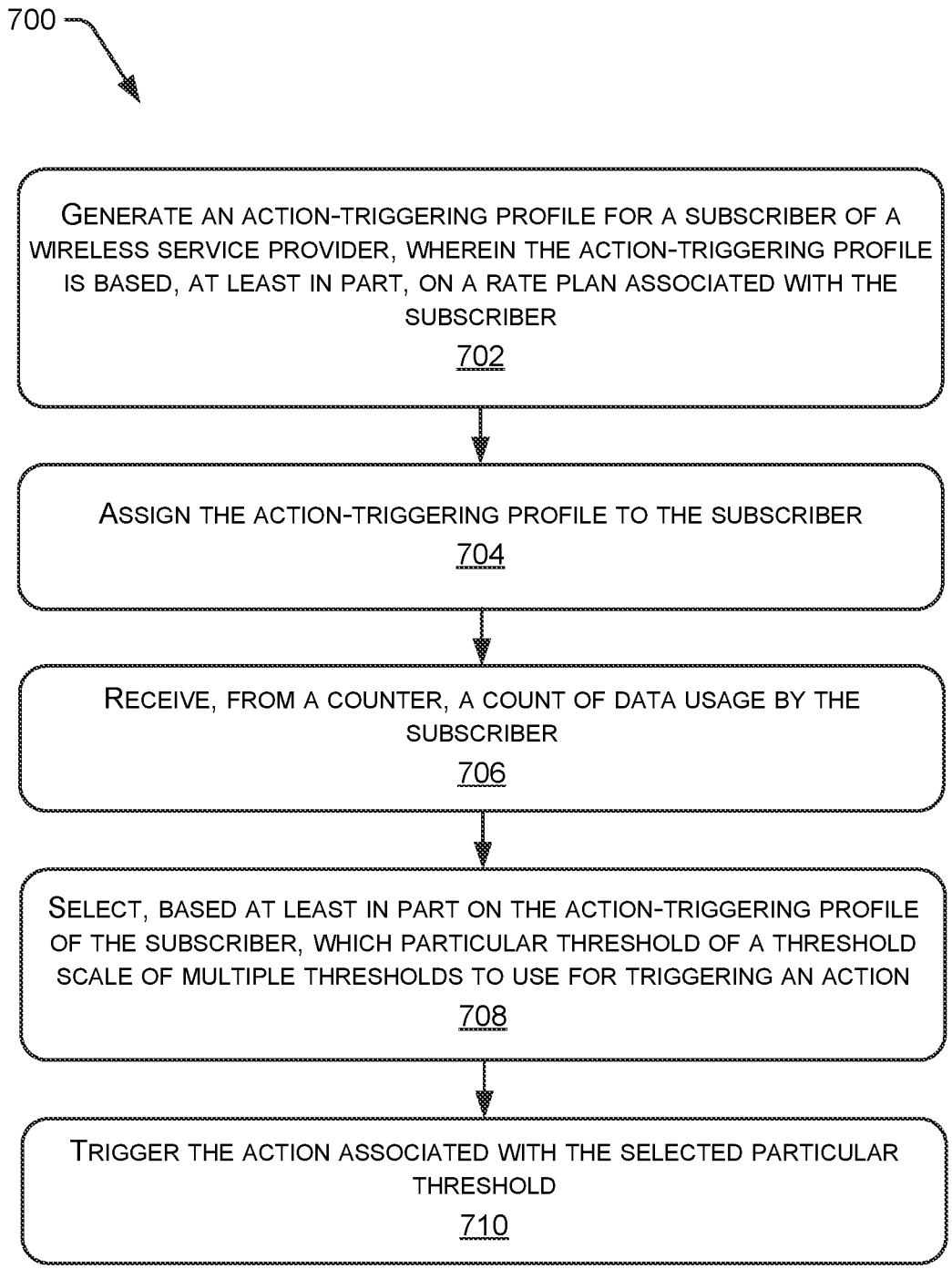
FIG. 7 is a flow diagram of a process for determining which among multiple count thresholds to use for triggering an action on a subscriber's account, according to some embodiments.

FIG. 7 is a flow diagram of a process 700 that network 302 may use for determining which among multiple count thresholds to use for triggering an action, according to embodiments. In some examples, process 700 may be performed by network server 308 of network 302.

The implementation of the various components described herein is a matter of choice dependent on the performance and other requirements of computing system involved. Accordingly, logical operations described herein may be referred to as operations, structural devices, acts, processes, or modules. These operations, structural devices, acts, processes, and modules can be implemented in software, in firmware, in special purpose digital logic, and any combination thereof. More or fewer operations can be performed than shown in the figures and described herein. These operations can also be performed in parallel, or in a different order than described herein. Some or all of these operations might also be performed by components other than those specifically identified. As mentioned above, process 700 may be performed, at least in part, by network server 308. Thus, in the example illustrated below, network server 308 is considered to be performing process 700, though claimed subject matter is not so limited.

At 702, network server 308 may generate an ATP for a subscriber of a wireless service provider, such as network 302. The ATP may be based, at least in part, on a rate plan associated with the subscriber. Examples of rate plans are illustrated in FIG. 1. As described above, rate plans generally correspond to one or more FUTs, which may be different for different rate plans. In some implementations, generating an ATP may be a priori forming an ATP for use for subscribers of a rate plan. The ATP may be subsequently modified for one or more subscribers at any time. For example, the ATP may be time-dependent, may be modified based on a calendar event, or may be based on a type of data usage within the usage plan.

At 704, network server 308 may assign the ATP to the subscriber. This may occur when the subscriber "signs up" to the rate plan. At 706, network server 308 may receive, from a counter, a count of data usage by the subscriber. At 708, network server 308 may select, based at least in part on the ATP of the subscriber, which particular threshold of a threshold scale to use for triggering an action. An action may be, for example, sending a notification email or text message to the subscriber. Another action may be to change data priority for the subscriber. At 710, network server 308 may trigger the action associated with the selected particular threshold.

Figure 8:
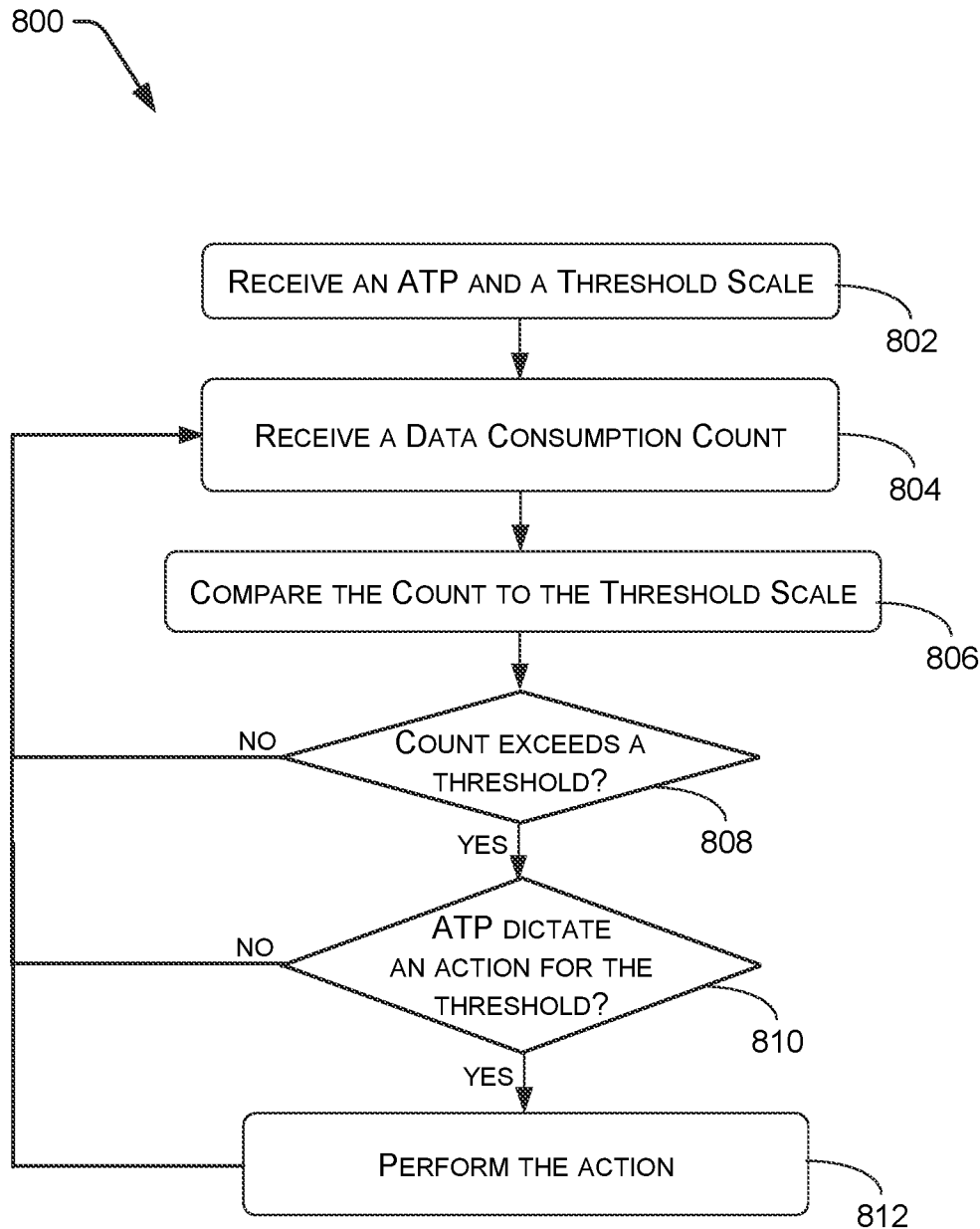
FIG. 8 is a flow diagram of a process for determining if a count threshold is to trigger an action on a subscriber's account, according to some embodiments.

FIG. 8 is a flow diagram of a process 800 for determining which among multiple count thresholds to use for triggering an action, according to some embodiments. Network server 308 is considered to be performing process 800, though claimed subject matter is not so limited. At 802, network server 308 may receive or access an ATP and a threshold scale. The ATP may be maintained by subscriber data repository 320 and the threshold scale may be maintained by policy management system 318, for example.

At 804, network server 308 may receive a data consumption count from one or more counters 508. At 806, network server 308 may compare the count to the threshold scale and determine, at 808, whether the count exceeds a threshold of the threshold scale. If not, then process 800 returns to 804 to update the data consumption count. If so, then process 800 proceeds to 810 where network server 308 determines whether the ATP dictates (e.g., sets forth) an action in response to the count exceeding the threshold. If not, then process 800 returns to 804 to update the data consumption count and no action is taken. For example, this may be the case if the threshold is an FUT that does not apply to a subscriber associated with the ATP. On the other hand, if the ATP dictates an action for the threshold, then process 800 proceeds to 812 where network server 308 performs the action. For example, this may be the case if the threshold is an FUT that does apply to the subscriber associated with the ATP.

Figure 9:
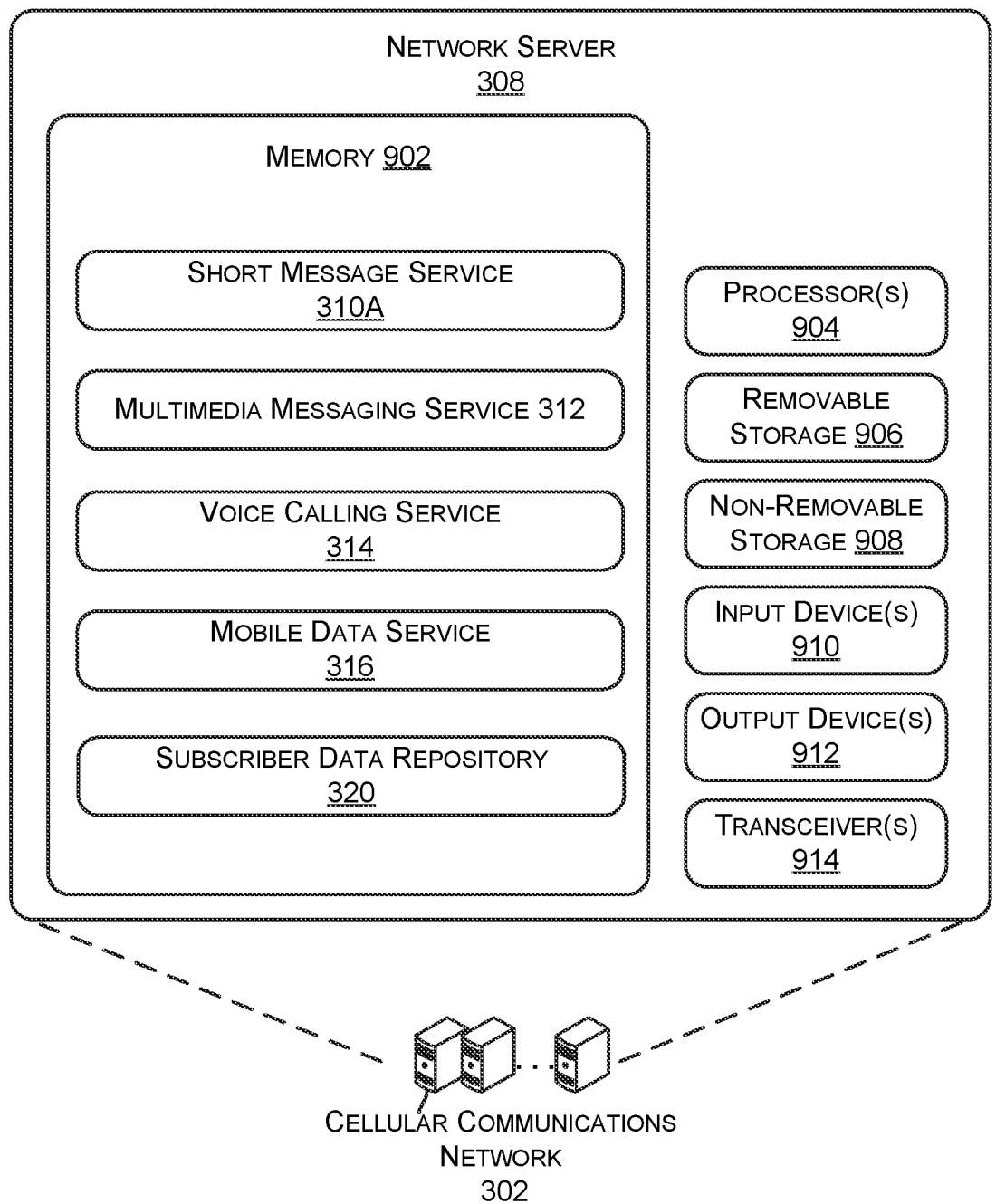
FIG. 9 is a block diagram of a network server, according to various embodiments.

FIG. 9 is a block diagram of network server 308 of network 302, first illustrated in FIG. 3, configured to operate with wireless device 306, according to various embodiments. For example, network 302 may be used to implement the various operations described herein. Network 302 may be implemented as a single device or as a plurality of devices with modules and data distributed among them. Network 302 may include memory 902 storing executable code and data for SMS 310A, MMS 312, voice calling service 314, mobile data service 316, and subscriber data repository 320, as described herein. Network 302 includes one or more processor(s) 904, removable storage 906, non-removable storage 908, input device(s) 910, output device(s) 912, and transceiver(s) 914.

In various embodiments, memory 902 may be volatile (such as RAM), non-volatile (such as ROM, flash memory, etc.), or some combination thereof. SMS 310A, MMS 312, voice calling service 314, and mobile data service 316 may comprise methods, threads, processes, applications, or any other sort of executable instructions. SMS 310A, MMS 312, voice calling service 314, mobile data service 316, and subscriber data repository 320 may also include files and databases (not illustrated) storing values associated with expected or nominal settings, values, etc., for the various services described. Various details of SMS 310A, MMS 312, voice calling service 314, mobile data service 316, and subscriber data repository 320 are provided above in the discussion of FIG. 3.

In some embodiments, one or more processor(s) 904 are central processing units (CPUs), graphics processing units (GPUs), or both CPU and GPU, or other processing units or components known in the art.

Network 302 may include additional data storage devices (removable and/or non-removable) such as, for example, magnetic disks, optical disks, or tape. Such additional storage is illustrated in FIG. 9 by removable storage 906 and non-removable storage 908. Tangible computer-readable media can include volatile and non-volatile, removable and non-removable media implemented in any method or technology for storage of information, such as computer readable instructions, data structures, program modules, or other data. Memory 902, removable storage 906, and non-removable storage 908 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by network 302. Any such tangible computer-readable media can be part of network 302.

Network 302 also can include input device(s) 910 such as a keypad, a cursor control, a touch-sensitive display, voice input device, etc., and output device(s) 912 such as a display, speakers, printers, haptic feedback, etc.

As illustrated in FIG. 9, network 302 may also include one or more wired or wireless transceiver(s) 914. Transceiver(s) 914 can include a network interface card (NIC), a network adapter, a LAN adapter, or a physical, virtual, or logical address to connect to cellular network, Wi-Fi network, OEM server(s), and wireless devices 306 and 106, for example. To increase throughput when exchanging wireless data, transceiver(s) 914 can utilize multiple-input/multiple-output (MIMO) technology. Transceiver(s) 914 may embody any sort of wireless transceiver device capable of engaging in wireless, radio frequency (RF) communication. Transceiver(s) 914 may also include other wireless modems, such as a modem for engaging in Wi-Fi, WiMAX, Bluetooth, or infrared communication.

Figure 10:
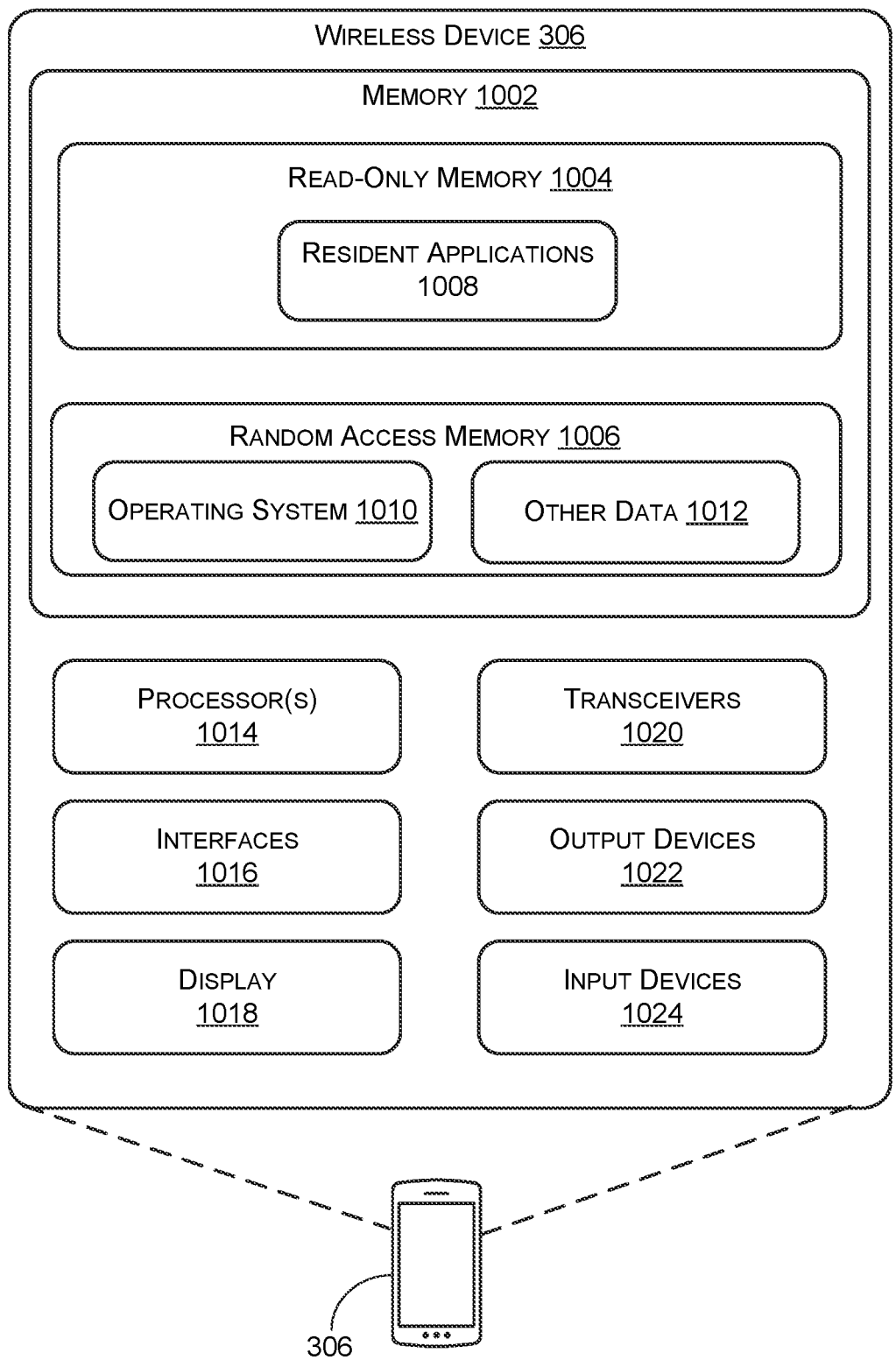
FIG. 10 is a block diagram of a wireless device, according to various embodiments.

FIG. 10 is a block diagram of wireless device 306 and illustrates a component level view of the wireless device configured with various components, according to embodiments. Wireless device 306 may include a system memory 1002 that includes ROM 1004 and RAM 10006. ROM 1004 may store resident applications 1008. In some examples, resident applications 1008 may be configured to work with various services on network 302, such as, for example, a short message service (SMS), a multimedia messaging service (MMS), a voice calling service, and a mobile data service, which may communicate with and or otherwise share information with corresponding services on network 302 including SMS 310A, MMS 312, voice calling service 314, and/or mobile data service 316.

RAM 1006 may include working memory that stores information such as an operating system 1010 and other data 1012. Other data 1012 may include application(s) such as voice calling clients, VoLTE calling clients, Wi-Fi calling clients, messaging applications, email applications, media player applications, video calling applications, video chat applications, web browsers, social media applications, any sort of real-time communication applications, or any other sort of applications. The application(s) embodied as other data 1012 may engage in communication with other applications, servers, or devices via a communication link over a network (e.g., the cellular network 302, the Internet, and/or Wi-Fi network, sending and receiving data packets.

ROM 1004 and RAM 1006 can include non-transitory computer-readable media (which may be non-volatile and volatile, respectively), and may include removable and non-removable tangible, physical media implemented in technology for storage of information, such as computer readable instructions, data structures, program modules, or other data. System memory 1002 (and removable storage 906 and non-removable storage 908 as illustrated in FIG. 9) are examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information and which can be accessed by wireless device 306. Any such non-transitory computer-readable media may be part of wireless device 306, network 302, and/or other components of system 300.

Wireless device 306 may further include processor(s) 1014 which, in some implementations, may be one or more central processing units (CPUs), graphics processing units (GPUs), or both CPUs and GPUs, or any other sort of processing unit.

Wireless device 306 may further include one or more interfaces 1016, a display 1018, transceivers 1020, output device(s) 1022, and input device(s) 1024. In some implementations, transceivers 1020 may include radios and/or modems, or combinations thereof known in the art. For example, transceivers 1020 may include one or more radio transceivers that performs the function of transmitting and receiving radio frequency communications via an antenna (not shown). The radios and/or modems may facilitate wireless connectivity between wireless device 306 and various devices or one or more networks (e.g., 302). In addition, transceivers 1020 may include a near field antenna for communicating over unlicensed wireless IP networks, such as local wireless data networks and personal area networks (e.g., Bluetooth or near field communication (NFC) networks). Further, transceivers 1020 may include wired communication components, such as an Ethernet port, that connect wireless device 306 in a wired fashion to devices of one or more networks. In various implementations, transceivers 1016 may interface with and be controlled by a radio chipset (not shown).

In some implementations, output devices 1022 include any sort of output devices known in the art, such as a display (e.g., a liquid crystal display), speakers, a vibrating mechanism, or a tactile feedback mechanism. Output devices 1022 also include ports for one or more peripheral devices, such as headphones, peripheral speakers, or a peripheral display.

In various implementations, input device(s) 1024 include any sort of input devices known in the art. For example, input device(s) 1024 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A wireless communication network comprising:
   one or more processors;
   a non-transitory storage medium; and
   instructions stored in the non-transitory storage medium, the instructions being executable by the one or more processors to:
   aggregate two or more threshold scales of respective rate plans offered by a wireless service provider to form an aggregated threshold scale;
   generate an action-triggering profile (ATP) for a subscriber of the wireless service provider, wherein the ATP is based, at least in part, on a rate plan associated with the subscriber, and wherein the ATP comprises a subset of thresholds of the aggregated threshold scale;
   assign the ATP to the subscriber;
   receive, from a counter, a count of data usage by the subscriber;
   select, based at least in part on i) the ATP of the subscriber and ii) the count of data usage by the subscriber, which particular threshold of the aggregated threshold scale to use for triggering an action corresponding to the particular threshold;
   trigger the action associated with the selected particular threshold;
   apply the aggregated threshold scale to other subscribers having different ATPs; and
   after applying the aggregated threshold scale to the other subscribers, dynamically modify the aggregated threshold scale on the fly in response to receiving a policy rule from the wireless service provider.

2. The wireless communication network of claim 1, wherein the action comprises sending a notification email or text message to the subscriber.

3. The wireless communication network of claim 1, wherein the ATP is time-dependent.

4. The wireless communication network of claim 1, wherein the ATP is based, at least in part, on a calendar event.

5. The wireless communication network of claim 1, wherein the ATP is based, at least in part, on a type of data usage within the usage plan.

6. The wireless communication network of claim 1, wherein the count of usage by the subscriber is a single count of usage of more than one type of data.

7. The wireless communication network of claim 1, wherein the aggregated threshold scale is dynamically modified on the fly in a spontaneous fashion, without modifying programming code used for managing the aggregated threshold scale.

8. One or more non-transitory computer-readable media storing computer-executable instructions that, when executed by one or more processors of a network element, cause a flow controller of the network element to perform operations comprising:
   aggregating two or more threshold scales of respective rate plans offered by a wireless service provider to form an aggregated threshold scale;
   generating an action-triggering profile (ATP) for a subscriber of the wireless service provider, wherein the ATP is based, at least in part, on a rate plan associated with the subscriber, and wherein the ATP comprises a subset of thresholds of the aggregated threshold scale;
   assigning the ATP to the subscriber;
   receiving, from a counter, a count of data usage by the subscriber;
   selecting, based at least in part on i) the ATP of the subscriber and ii) the count of data usage by the subscriber, which particular threshold of the aggregated threshold scale to use for triggering an action corresponding to the particular threshold;
   triggering the action associated with the selected particular threshold;
   applying the aggregated threshold scale to other subscribers having different ATPs; and
   after applying the aggregated threshold scale to the other subscribers, dynamically modifying the aggregated threshold scale on the fly in response to receiving a policy rule from the wireless service provider.

9. The one or more non-transitory computer-readable media of claim 8, wherein the action comprises sending a notification email or text message to the subscriber.

10. The one or more non-transitory computer-readable media of claim 8, wherein the ATP is time-dependent.

11. The one or more non-transitory computer-readable media of claim 8, wherein the ATP is based, at least in part, on a calendar event.

12. The one or more non-transitory computer-readable media of claim 8, wherein the ATP is based, at least in part, on a type of data usage within the usage plan.

13. The one or more non-transitory computer-readable media of claim 8, wherein the count of usage by the subscriber is a single count of usage of more than one type of data.

14. A computer-implemented method comprising:
    aggregating two or more threshold scales of respective rate plans offered by a wireless service provider to form an aggregated threshold scale;
    generating an action-triggering profile (ATP) for a subscriber of the wireless service provider, wherein the ATP is based, at least in part, on a rate plan associated with the subscriber, and wherein the ATP comprises a subset of thresholds of the aggregated threshold scale;
    assigning the ATP to the subscriber;
    receiving, from a counter, a count of data usage by the subscriber;

selecting, based at least in part on i) the ATP of the subscriber and ii) the count of data usage by the subscriber, which particular threshold of the aggregated threshold scale to use for triggering an action corresponding to the particular threshold;

triggering the action associated with the selected particular threshold; and applying the aggregated threshold scale to other subscribers having different ATPs; and after applying the aggregated threshold scale to the other subscribers, dynamically modifying the aggregated threshold scale on the fly in response to receiving a policy rule from the wireless service provider.

15. The computer-implemented method of claim 14, wherein the action comprises sending a notification email or text message to the subscriber.

16. The computer-implemented method of claim 14, wherein the ATP is time-dependent.

17. The computer-implemented method of claim 14, wherein the ATP is based, at least in part, on a calendar event.

18. The computer-implemented method of claim 14, wherein the ATP is based, at least in part, on a type of data usage within the usage plan.

* * * * *